United States Patent
Kawano et al.

(10) Patent No.: US 12,312,280 B2
(45) Date of Patent: May 27, 2025

(54) THERMAL BARRIER MATERIAL FORMED OF INORGANIC MATERIAL, MATERIAL SET FOR PRODUCING SAME, MATERIAL FOR BASE LAYERS AND METHOD FOR PRODUCING SAME

(71) Applicants: Kasai Industry CO., LTD., Aichi (JP); Nagoya Denki Educational Foundation, Aichi (JP)

(72) Inventors: Junichi Kawano, Aichi (JP); Yuichi Kobayashi, Aichi (JP)

(73) Assignees: Kasai Industry CO., LTD., Aichi (JP); Nagoya Denki Educational Foundation, Aichi (JP)

( * ) Notice: Subject to any disclaimer, the term of this patent is extended or adjusted under 35 U.S.C. 154(b) by 913 days.

(21) Appl. No.: 17/598,787

(22) PCT Filed: Nov. 17, 2020

(86) PCT No.: PCT/JP2020/042858
§ 371 (c)(1),
(2) Date: Sep. 27, 2021

(87) PCT Pub. No.: WO2021/100717
PCT Pub. Date: May 27, 2021

(65) Prior Publication Data
US 2022/0169576 A1    Jun. 2, 2022

(30) Foreign Application Priority Data
Nov. 19, 2019  (JP) ................... 2019-208594

(51) Int. Cl.
C03C 3/062  (2006.01)
C03C 4/02   (2006.01)
(Continued)

(52) U.S. Cl.
CPC ............ C04B 41/524 (2013.01); C03C 3/062 (2013.01); C03C 4/02 (2013.01); C03C 8/02 (2013.01);
(Continued)

(58) Field of Classification Search
CPC .. C09D 7/61; C03C 4/02; C03C 3/062; C03C 8/02
See application file for complete search history.

(56) References Cited

U.S. PATENT DOCUMENTS 3,501,321 A * 3/1970 Margola ................ C04B 41/009
427/374.3

FOREIGN PATENT DOCUMENTS

JP  2593968     *  2/1991
JP  H04-246478 A   9/1992
(Continued)

OTHER PUBLICATIONS

Ferrari, Chiara et al., Design of ceramic tiles with high solar reflectance through the development of a functional engobe, Ceramics International, 2013, vol. 3 9, No. 8, pp. 9583-9590.
(Continued)

*Primary Examiner* — Matthew E. Hoban
(74) *Attorney, Agent, or Firm* — Polson Intellectual Property Law P.C.; Margaret Polson

(57) ABSTRACT

A novel heat shielding material made of an inorganic material is proposed.
A heat shielding material made of an inorganic material, including:
  a base material;
  a underlayer layered on the base material; and
  a top layer layered on the underlayer, wherein
  the top layer has a thickness such that the underlayer is not visually recognizable, and transmits infrared rays, and
(Continued)

the underlayer includes a commingled between a material of the underlayer and a material of the top layer, and a main reflection region where the material of the top layer is not present.

By a suitable combination of the top layer and the underlayer, a high solar reflectance (TSR) exceeding 30% can be obtained even at an L* of 40 or less.

5 Claims, 6 Drawing Sheets

(51) Int. Cl.
- *C03C 8/02* (2006.01)
- *C03C 8/14* (2006.01)
- *C04B 41/00* (2006.01)
- *C04B 41/50* (2006.01)
- *C04B 41/52* (2006.01)
- *C04B 41/86* (2006.01)
- *C04B 41/89* (2006.01)
- *E04D 1/22* (2006.01)

(52) U.S. Cl.
CPC ............ *C03C 8/14* (2013.01); *C04B 41/0072* (2013.01); *C04B 41/009* (2013.01); *C04B 41/5022* (2013.01); *C04B 41/86* (2013.01); *C04B 41/89* (2013.01); *C03C 2204/00* (2013.01); *C03C 2209/00* (2013.01); *E04D 1/22* (2013.01)

(56) References Cited

FOREIGN PATENT DOCUMENTS

| | | | |
|---|---|---|---|
| JP | H04246478 | * | 9/1992 |
| JP | 2001157871 | * | 6/2001 |
| JP | 4138129 | * | 8/2008 |
| JP | 2009155895 A | | 7/2009 |
| JP | 43589290 B1 | | 11/2009 |
| JP | 2010180083 A | | 8/2010 |
| JP | 2011117266 A | | 6/2011 |
| JP | 2014193803 | * | 10/2014 |
| JP | 2014193803 A | | 10/2014 |
| JP | 201540331 A | | 3/2015 |
| JP | 5737523 B2 | | 5/2015 |

OTHER PUBLICATIONS

International Search Report dated May 27, 2021 in parent International application PCT/JP2020/042858.
Written Opinion of the International Searching Authority dated May 27, 2021 in parent International application PCT/JP2020/042858.
Office action dated Nov. 10, 2022 in related Chinese application No. 202080026784.9.

* cited by examiner

THERMAL BARRIER MATERIAL FORMED OF INORGANIC MATERIAL, MATERIAL SET FOR PRODUCING SAME, MATERIAL FOR BASE LAYERS AND METHOD FOR PRODUCING SAME

TECHNICAL FIELD

The present invention relates to improvement on a heat shielding material made of an inorganic material, a material set for producing the heat shielding material, a material for a underlayer, and a method for producing the heat shielding material.

BACKGROUND ART

From the viewpoint of recent energy saving demands, building materials are required to have high heat shielding properties.

Among building materials, black building materials represented by roof tiles are particularly required to have improved heat shielding properties. For example, the Japan Heat Island Conference has set a goal of achieving an infrared reflectance of 40% or more and a solar reflectance of 30% for a black heat shielding glaze having an L* value of 40 or less.

The present invention is directed to a heat shielding material made of an inorganic material, but a paint made of an organic material has a similar problem. For example, Patent Literature 1 discloses a technique related to the present invention.

Patent Literature 2 proposes a pigment having high heat shielding properties.

Non Patent Literature 1 discloses an engobe that exhibits a solar reflectance of 90% or more.

CITATIONS LIST

Patent Literature

Patent Literature 1: JP H04-246478 A
Patent Literature 2: JP 5737523 B

Non-Patent Literature

Non Patent Literature 1: Design of ceramic tiles with high solar reflectance through the development of a functional engobe, Ceramics International 39 (2013), 9583-9590, Abstract

SUMMARY OF INVENTION

Technical Problems

The inventors of the present application have proposed a pigment disclosed in Patent Literature 2 as a pigment having high solar reflectance (total solar reflectance). That is, the pigment is a black pigment composed of a $(Cr,Fe)_2O_3$ solid solution and having an L* value of 30 or less, more specifically, a black pigment having a ratio (molar ratio) of Cr to Fe of 93 to 97:7 to 3 and having a non-spinel structure. A top layer using such a pigment exhibits an infrared reflectance (hereinafter, may be simply referred to as "NIR") of 45%, also has a solar reflectance (hereinafter, may be simply referred to as "TSR") of 24%, and thus has high heat shielding properties. Here, the ratio (molar ratio) of Cr to Fe can also be set to 80 to 97:20 to 3.

However, the goal of the relationship of NIR≥40% and TSR≥30% at L* value≤40 set by the Japan Heat Island Conference has not been achieved.

Solutions to Problems

The present inventors have intensively studied to achieve the above goal. As a result, the present inventors have found that the reason why a glaze using the above pigment exhibits a relatively high NIR (=45%) is that while the pigment itself has a function of reflecting infrared rays, the top layer containing the pigment also has a function of transmitting infrared rays. That is, the incident infrared rays are transmitted through the top layer and reflected by the base material supporting the top layer, and the reflected infrared rays are again transmitted through the top layer and released to the outside.

Based on such findings, the present inventors have considered that if the light reflectance of the surface of the base material is increased, the NIR as the top layer is improved, whereby the TSR of the top layer is improved.

Therefore, the surface of the base material was coated with a material (underlayer) having a higher light reflectance than that of the base material, and the TSR of the underlayer was measured. The results are shown in FIG. 1. The results of FIG. 1 show that as the infrared reflectance NIR of the underlayer increases, the solar reflectance TSR as the entire heat shielding material, that is, as a composite layer of the underlayer and the top layer also increases.

When the black pigment of Example 1 was used, the result showed that when the TSR of the underlayer was 80% or more, the solar reflectance TSR of the entire heat shielding material was almost 30% or more. Since the black pigment of Example 1 originally has an NIR of 45%, the goal required by the Japan Heat Island Conference has been achieved.

DESCRIPTION OF EMBODIMENTS

Figure 1:
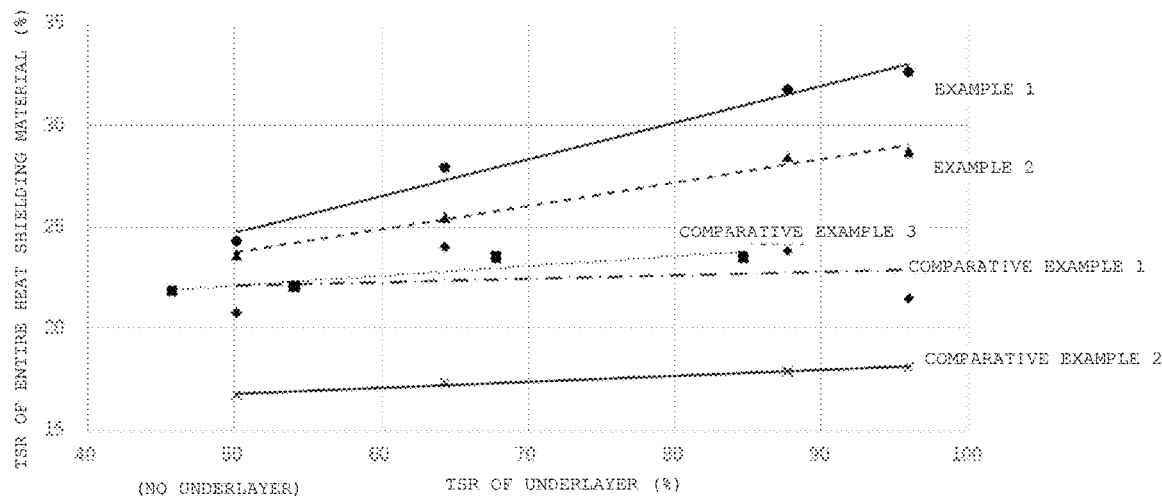
FIG. 1 is a graph showing the relationship between the TSR of the entire heat shielding material and the TSR of the underlayer in Examples and Comparative Examples.

In the results of FIG. 1, the specifications of the heat shielding material of Example 1 before sintering were as follows.

Base Material:
  Material; ceramic ware
  Thickness; 5 to 20 mm
Underlayer:
  Material (composition); represented by the Seger formula: RO: 0.1 to 0.5, $R_2O$: 0.5 to 0.9, $Al_2O_3$: 2.2 to 10.2, $SiO_2$: 7.2 to 29.2, $TiO_2$: 0.0 to 0.5, $ZrSiO_4$: 0.0 to 5.5, $SiO_2/Al_2O_3$: 0.7 to 23.8, where RO is MgO, CaO, or BaO, and $R_2O$ is $Li_2O$, $Na_2O$, or $K_2O$
  Thickness; 100 μm The TSR of the underlayer is a value when the underlayer was fired alone (that is, no top layer was layered), and was changed by blending adjustment. The TSR of the base material is 50%. That is, 50% on the horizontal axis indicates a case where there is no underlayer.

Top Layer:
  Material; glaze containing a black pigment (Example 1: product name: 42-710A (Kasai Industry Co, Ltd)
  Note) black pigment (Example 1): a $(Cr,Fe)_2O_3$ solid solution having a ratio (molar ratio) of Cr and Fe of 93 to 97:7 to 3 or a ratio (molar ratio) of Cr and Fe of 80 to 97:20 to 3 and having a non-spinel structure
  L* value of top layer: 30 or less
Firing Conditions:
  Firing temperature; 1,130 to 1,150° C.
  Retention time; 1 to 3 hours
Measurement Conditions of TSR:
  Measuring instrument: ultraviolet-visible infrared spectrophotometer V-670 manufactured by JASCO Corporation The conditions of the top layer of Example 2 were the same as those of Example 1 except that product name: ECO Black (Kasai Industry Co, Ltd) was used as the black glaze.

The conditions of the top layer of Comparative Example 1 were the same as those of Example 1 except that product name: C Black (Kasai Industry Co, Ltd) was used as the black glaze.

The conditions of the top layer of Comparative Example 2 were the same as those of Example 1 except that product name: Black Matte (Kasai Industry Co, Ltd) was used as the black glaze.

Note that in the top layer containing the black pigment of Example 2, as the TSR of the underlayer increases, the TSR of the entire heat shielding material, that is, the TSR of the composite layer of the underlayer and the top layer also increases.

On the other hand, in the top layers containing the black pigments of Comparative Examples 1 and 2, the modification of TSR of the underlayer hardly affected the TSR of the entire heat shielding material.

The L* in each of Example 2 and Comparative Examples 1 and 2 was 30 or less.

As described above, the present invention can be defined as follows. That is,
  a heat shielding material including:
  a base component having a solar reflectance (TSR) on a surface of 80% or more; and
  a top layer layered on a surface of the base component, the top layer containing a black pigment composed of a $(Cr,Fe)_2O_3$ solid solution having a ratio (molar ratio) of Cr to Fe of 93 to 97:7 to 3 or a ratio (molar ratio) of Cr to Fe of 80 to 97:20 to 3 and having a non-spinel structure, and having an L* value of 30 or less.

According to the heat shielding material thus configured, the solar reflectance (TSR) is 30% or more. Of course, the infrared reflectance (NIR) is also 40% or more.

The background on which such a high-spec heat shielding material was obtained is a new finding by the present inventors, that is, the finding that infrared rays are transmitted through the top layer made of an inorganic material and are reflected by the underlayer. Here, it is assumed that the top layer has a thickness such that the underlayer is not visually recognizable. This is to secure designability as a heat shielding material.

Incidentally, as described in Patent Literature 1, there is an organic paint that transmits infrared rays. In the case of an organic paint, an organic underlayer having a high TSR is formed, and the organic paint is applied to the organic underlayer after drying the organic underlayer. At this time, the organic underlayer and the paint layer are separated into layers, and the materials of the both layers are not mixed or reacted.

On the other hand, the heat shielding material made of an inorganic material has the following problems.

The top layer is naturally vitrified, whereas vitrification of the underlayer must be avoided. This is because when the underlayer is vitrified, the TSR is remarkably lowered.

In the case of a heat shielding material made of an inorganic material, generally, a slurry of a glaze is layered on a slurry of a underlayer, and then both are fired simultaneously. At the firing temperature in this firing, the material of the top layer is completely vitrified. On the other hand, the material of the underlayer is not vitrified. In other words, the material of the underlayer is a state in which particles constituting the underlayer are sintered, that is, a state in which the surfaces of the particles are melted and bonded to each other.

When the underlayer is fired alone, the material of the underlayer is sintered uniformly as a whole, and the surface thereof has a high light reflectance. However, when the underlayer is sintered in a state in which the top layer is layered thereon, the material of the top layer is heated to a temperature higher than the vitrification temperature and fluidized, and infiltrates between particles of the material of the underlayer, and reacts with the material of the underlayer. When the sintering process is completed and the materials are cooled, the material of the top layer and the material of the underlayer that have reacted with each other form a vitrified commingled. Since such a vitrified commingled transmits light, high light reflectance cannot be secured.

As a result of intensive studies to solve such problems, the present inventors have considered that it is inevitable that the material of the underlayer and the material of the top layer react with each other by firing to form a commingled. Then, the present inventors have considered that if the underlayer is thickened to secure a region in which the material of the top layer does not infiltrate even during firing, sufficient light reflection can be secured on the surface of the region.

That is, a first aspect of the present invention is defined as follows.

A heat shielding material made of an inorganic material, including:
  a base material; and
  a underlayer layered on the base material; and
  a top layer layered on the underlayer, wherein
  the top layer has a thickness such that the underlayer is not visually recognizable and transmits infrared rays, and
  the underlayer includes a commingled between a material of the underlayer and a material of the top layer, and a main reflection region where the material of the top layer is not present.

According to the first aspect of the present invention defined as above, since the underlayer includes the main reflection region, infrared rays transmitted through the top layer can be reflected by the main reflection region. Here, the main reflection region substantially composed only of the material of the underlayer is presumably required to have a thickness of 10 μm or more. When the thickness of the main reflection region is less than 10 μm, infrared rays having been transmitted through the top layer and the commingled may be transmitted through the main reflection layer. The upper limit of the layer thickness of the main reflection region is not particularly limited, but is 300 μm.

Figure 2:
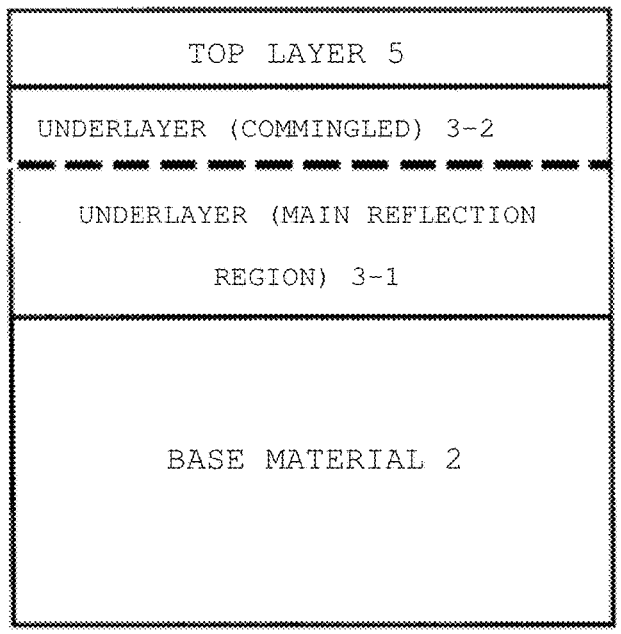
FIG. 2 is a schematic view illustrating a configuration of a heat shielding material according to Examples of the present invention.

FIG. 2 illustrates a basic structure of a heat shielding material 1 of the present invention. As illustrated in FIG. 2, when the main reflection region of the underlayer has a sufficient thickness, infrared rays transmitted through the top layer and the underlayer can be reliably reflected by the main reflection region.

This makes it possible to use the light reflection characteristics (TSR) of the underlayer as illustrated in each Example of FIG. 1.

Figure 3:
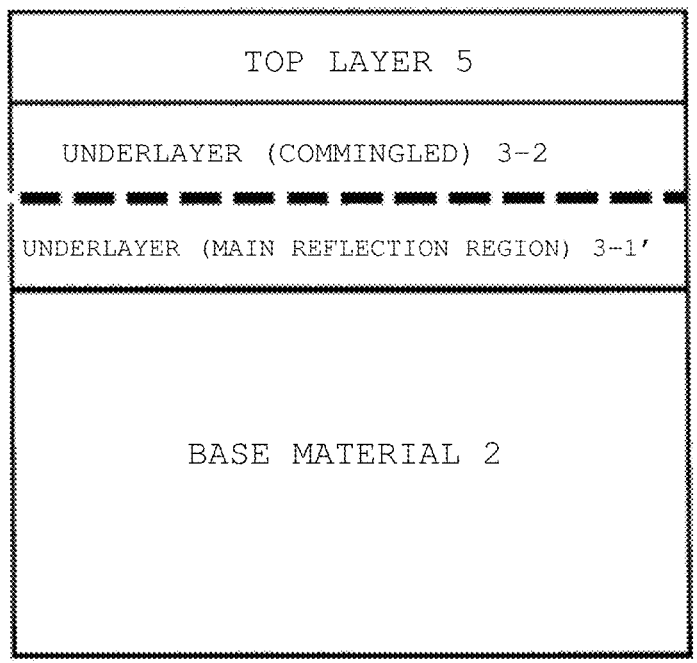
FIG. 3 is a schematic view illustrating a configuration of a heat shielding material of Comparative Examples of the present invention.

FIG. 3 illustrates a heat shielding material of Comparative Examples in which the thickness of the underlayer is reduced. The thickness of the entire underlayer was reduced as compared with the example of FIG. 2. As a result, the main reflection region becomes thin, and the infrared rays having been transmitted through the top layer and the underlayer are transmitted through the main reflection region and are absorbed by the base material.

With respect to the black pigment used in Example 1 of FIG. 1, the relationship between the TSR of the underlayer and the TSR of the entire heat shielding material in a heat shielding material including a underlayer having a thickness of 30 μm (Comparative Example 3) is indicated by the dotted line in FIG. 1.

In Comparative Example 3, since the underlayer is thin, the material of the top layer infiltrates into the entire underlayer, that is, the entire underlayer is a commingled. As a result, the infrared rays transmitted through the top layer and the underlayer are mainly reflected by the surface of a base material 2.

In the example of Comparative Example 3, the underlayer does not exert any effect on the TSR characteristics of the heat shielding material.

As can be seen from the above, the presence of the main reflection region having a sufficient thickness is required in the underlayer.

In light of the above, the present inventors have conducted intensive studies on a method for securing such a main commingled in the underlayer when the top layer is layered on the material of the underlayer and fired.

According to the studies of the present inventors, the following methods (1) to (3) are conceivable.

(1) A sufficient thickness is secured in the underlayer itself.

Figure 4:
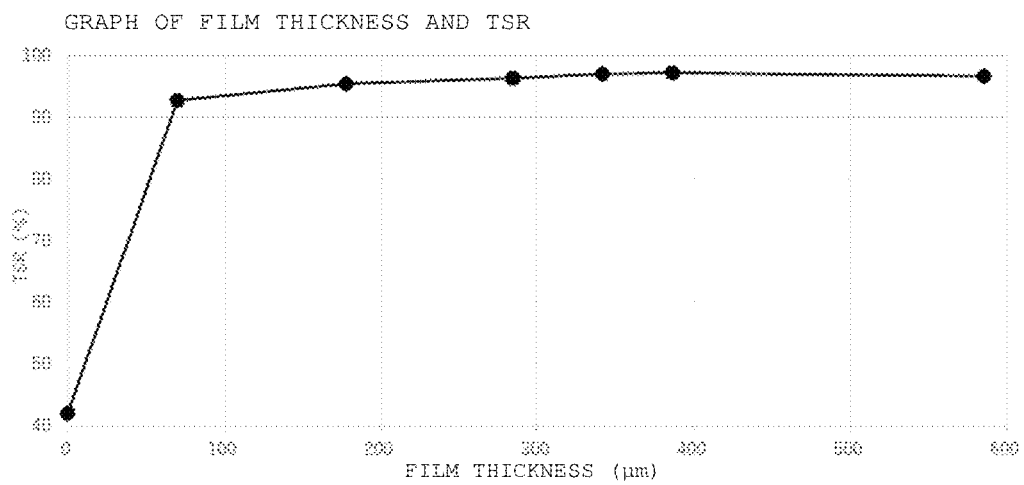
FIG. 4 is a graph showing the relationship between the underlayer and TSR.

FIG. 4 shows the relationship between the film thickness of the underlayer used for the above Examples and the TSR thereof. At this time, the top layer is not layered on the underlayer, and the underlayer is exposed. The relationship of FIG. 4 shows that the film thickness of the underlayer is preferably 70 μm or more. When the film thickness is less than 70 μm, the film thickness of the underlayer is nonuniform, so that infrared rays and light of other wavelengths may preferentially be transmitted through the thin portion of the underlayer.

By selecting the material of the underlayer, the transmittance of infrared rays is reduced, the uniformity of the film thickness is secured, and further the density of the underlayer is increased. According to the studies of the present inventors, when a thickness of 50 μm or more is secured as the underlayer, a thickness of 10 μm or more can be secured in the region other than the commingled between the material of the top layer and the material of the underlayer, that is, the main reflection region under the general firing conditions of the top layer.

(2) A slurry of the top layer is layered on the fired underlayer, and then fired.

When the underlayer is fired in advance, materials of the both the layers hardly react even if the top layer is fired thereafter. Therefore, in this case, since the entire region of the underlayer functions as the main reflection region, a sufficient thickness can be secured.

(3) Relationship between top layer and firing temperature

When the slurry of the top layer is layered on the slurry of the underlayer and fired, it is inevitable that both materials react to form a commingled. However, formation of the commingled can be suppressed by selecting the material of the top layer.

That is, if the firing temperature is set, fluidization of the material of the top layer can be suppressed by bringing the vitrification temperature of the top layer close to the firing temperature as much as possible. This prevents the material of the top layer from infiltrating into the underlayer, thereby suppressing formation of the commingled.

Note that the underlayer can be made of a plurality of materials. For example, in the underlayer, a layer on the top layer side can be made of a material having a higher reflectance, and a layer on the base material side can be made of a material having higher bonding properties.

The thickness of the top layer is not specified, and can be optionally selected according to designability, durability, and the like required for the top layer. In order to secure the designability of the top layer, particularly the color, the thickness of the top layer is preferably such that the underlayer is not visually recognizable. The thickness of the top layer can be, for example, 50 to 100 μm.

The top layer may be composed of a plurality of material layers.

The present inventors focused on the HMS measurement (measurement with a heating microscope) of the material of the top layer.

Figure 5:
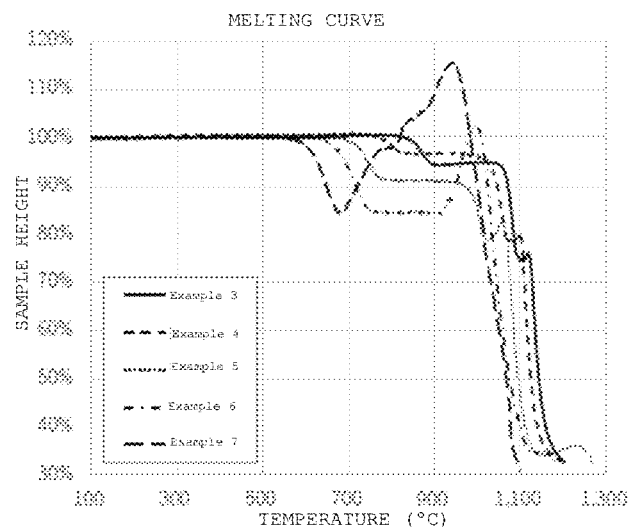
FIG. 5 shows the melting curves of the glazes of Examples.
Figure 6:
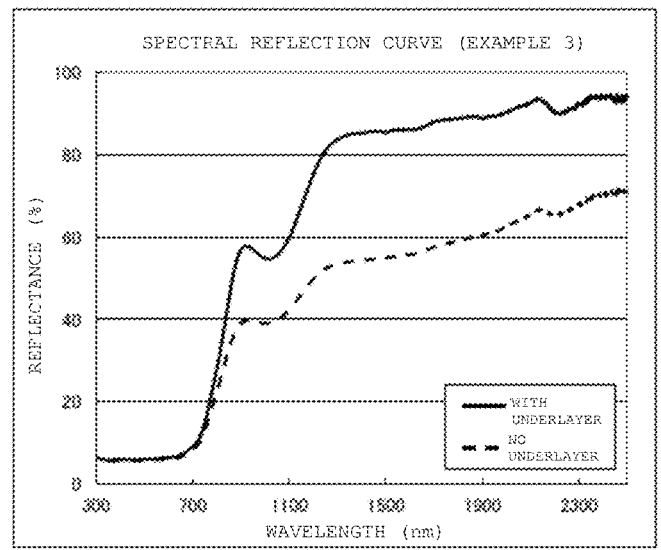
FIG. 6 shows the spectral reflectance curves of Example 3.
Figure 7:
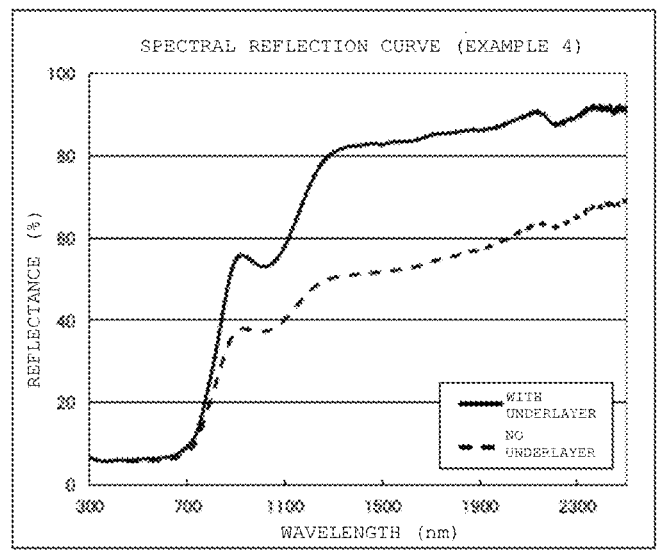
FIG. 7 shows the spectral reflectance curves of Example 4.
Figure 8:
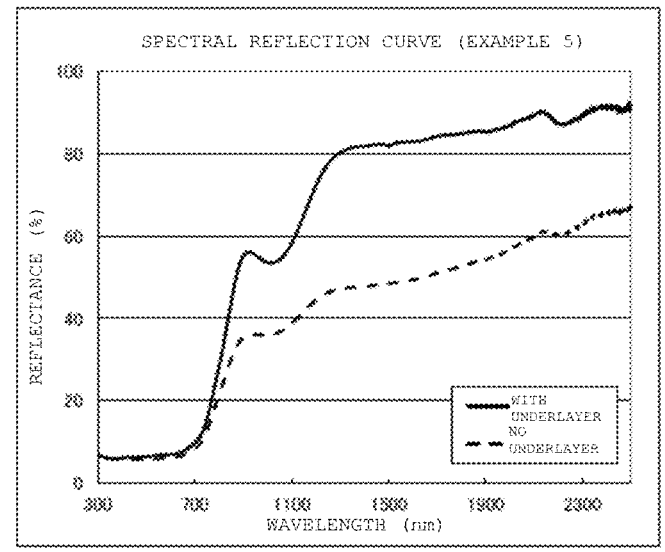
FIG. 8 shows the spectral reflectance curves of Example 5.
Figure 9:
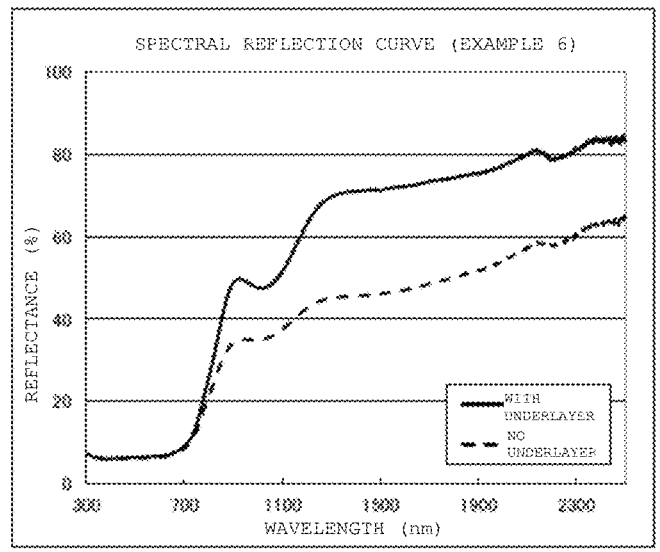
FIG. 9 shows the spectral reflectance curves of Example 6.
Figure 10:
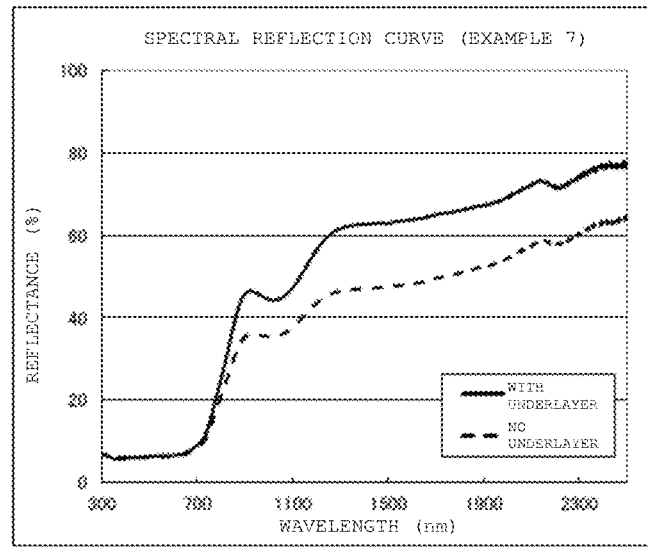
FIG. 10 shows the spectral reflectance curves of Example 7.

FIG. 5 shows the melting curves of the glazes of Examples 3 to 7.

The hemispherical temperatures (HT) of the glazes of Examples 3 to 7 were as follows.

Example 3: 1,141° C.
Example 4: 1,121° C.
Example 5: 1,088° C.
Example 6: 1,053° C.
Example 7: 1,035° C.

The melting curves in FIG. 5 were measured with a Heating Microscope EM301 manufactured by Hesse Instruments e.K.

The HT (hemispherical temperature) was also measured with Heating Microscope EM301 manufactured by Hesse Instruments e.K.

The HMS measurement is a method for confirming the melting behavior of the glaze by high-temperature heating microscopy.

The temperature increase conditions are 60° C./min up to 500° C., 10° C./min at 500 to 1,000° C., and 5° C./min at 1,000° C. or higher.

The HT (hemispherical temperature) is a temperature at which the height of the measurement sample becomes half of the base width and conforms to the standard of DIN 51730 Bestimmug des Asche-Schmelzverhaltens.

FIGS. 6 to 10 and Table 1 show spectral reflectance curves when the glazes of Examples 3 to 7 were respectively used. As the underlayer, one having a TSR of 80% when fired alone was used, and the thickness thereof was 100 μm.

The spectral reflectance curve was measured with an ultraviolet-visible infrared spectrophotometer V-670 manufactured by JASCO Corporation.

From the results in FIGS. 6 to 10 and Table 1, the temperature of HT of the top layer is preferably from the firing temperature or lower to a temperature lower than the firing temperature by 100° C. or less, more preferably a temperature lower than the firing temperature by 50° C. or less, and most preferably equal to the firing temperature. The firing temperature in Examples 3 to 7 was 1,140° C. In Examples 3 to 7, the outflow temperature (the temperature at which the glaze material is transformed into fluid) was 100° C. higher than the firing temperature.

In a case of a glaze material having an outflow temperature more than 100° C. higher than the firing temperature, for example, a glaze material having an outflow temperature of 150° C. or more higher than the firing temperature, the main reflection region can be secured even when the HT is more than 100° C. lower than the firing temperature, for example, when the HT is 150° C. or less.

Of course, an outflow temperature closer to the firing temperature can suppress the firing cost.

In other words, it is preferable to employ a material having a vitrification temperature substantially equal to the firing temperature as the material of the top layer and to suppress the fluidity when heated to the firing temperature as much as possible.

TABLE 1

|  | No underlayer | | | Two layers (with underlayer) | | | Difference (two layers - no underlayer) | | |
| --- | --- | --- | --- | --- | --- | --- | --- | --- | --- |
|  | TSR (%) | NIR (%) | L* | TSR (%) | NIR (%) | L* | TSR (%) | NIR (%) | L* |
| Example 3 | 23.3 | 43.9 | 29.4 | 32.4 | 63.6 | 30.2 | 9.1 | 19.7 | 0.8 |
| Example 4 | 22.3 | 41.6 | 29.3 | 31.6 | 61.6 | 30.7 | 9.3 | 20.0 | 1.4 |
| Example 5 | 21.5 | 39.7 | 29.5 | 31.7 | 61.6 | 31.4 | 10.2 | 21.9 | 1.9 |
| Example 6 | 21.1 | 38.3 | 30.3 | 28.5 | 54.5 | 31.1 | 7.4 | 16.2 | 0.8 |
| Example 7 | 21.2 | 38.9 | 30.0 | 26.3 | 49.8 | 30.8 | 5.1 | 10.9 | 0.8 |

As the composition of a material of the top layer in which the HT falls within a temperature lower than the firing temperature of 1,140° C. by 100° C. or less, a composition represented by the following Seger formula: RO: 0.5 to 0.9, $R_2O$: 0.1 to 0.5, $B_2O_3$: 0.0 to 1.0, $Al_2O_3$: 0.3 to 1.0, $SiO_2$: 1.3 to 3.7, $SiO_2/Al_2O_3$: 3.4 to 6.9, where RO is MgO, CaO, or BaO, and $R_2O$ is $Li_2O$, $Na_2O$, or $K_2O$ can be employed.

The following components may be contained as long as the reflectance is not impaired. Examples of the components include chromium, manganese, iron, cobalt, nickel, copper, zinc, tin, and zircon.

In the present invention, the results in FIG. 1 also show that the light reflectance of the underlayer greatly affects the TSR. Therefore, the present inventors have studied the composition of a underlayer whose TSR is 80% (film thickness: 100 μm) or more when fired alone, and found that the following composition is preferable. That is, a composition which can be represented by the following Seger formula: RO: 0.1 to 0.5, $R_2O$: 0.5 to 0.9, $B_2O_3$: 0.0 to 1.0, $Al_2O_3$: 2.2 to 10.2, $SiO_2$: 7.2 to 29.2, $TiO_2$: 0.0 to 0.5, $ZrSiO_4$: 0.0 to 5.5, $SiO_2/Al_2O_3$: 0.7 to 23.8, where RO is MgO, CaO, or BaO, and $R_2O$ is $Li_2O$, $Na_2O$, or $K_2O$ is employed.

The following components may be contained as long as the reflectance is not impaired. Examples of the components include chromium, manganese, iron, cobalt, nickel, copper, zinc, and tin.

A powder obtained by firing the material of the underlayer was subjected to X-ray diffraction, and the average value of the peak intensities in the range of 2θ=23 to 25 degrees was calculated as the halo intensity. The results are shown in FIG. 11.

Figure 11:
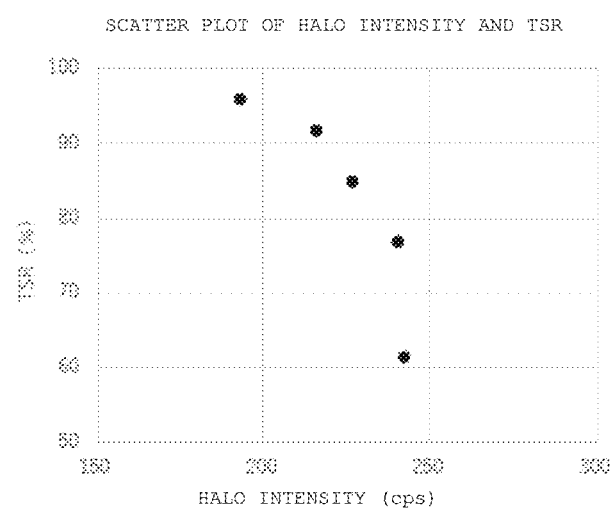
FIG. 11 is a graph showing the relationship between the TSR of the underlayer (single) and the halo intensity.

The X-ray diffractometer used for obtaining the results in FIG. 11 was model number D2 PHASER, manufactured by Bruker.

The results in FIG. 11 show that the halo intensity is preferably 230 cps or less in order to set the TSR of the underlayer to 80% or more.

In general, a smaller halo intensity indicates less vitrification. Accordingly, the main reflection region in the underlayer preferably has a halo intensity of 230 cps or less.

The present invention is not limited to the description of the embodiments and examples of the invention. Various modifications that can be easily conceived by those skilled in the art without departing from the scope of the claims are also included in the present invention.

REFERENCE SIGNS LIST

2 Base material
3 Underlayer
3-1 Main reflection region
3-2 Commingled
5 Top layer

The invention claimed is:

1. A heat shielding material made of an inorganic material, comprising:
 a base material;
 a underlayer layered on the base material and having a total solar reflectance (TSR) greater than a TSR of the base material; and
 a top layer layered on the underlayer, wherein
 the top layer has a thickness such that the underlayer is not visually recognizable, and transmits infrared rays,
 the underlayer includes a reaction region between a material of the underlayer and a material of the top layer, and a main reflection region where the material of the top layer is not present, and
 the main reflection region has a thickness of 10 μm or more.

2. The heat shielding material according to claim 1, wherein the material of the underlayer is represented by a Seger formula: RO: 0.1 to 0.5, $R_2O$: 0.5 to 0.9, $B_2O_3$: 0.0 to 1.0, $Al_2O_3$: 2.2 to 10.2, $SiO_2$: 7.2 to 29.2, $TiO_2$: 0.0 to 0.5, $ZrSiO_4$: 0.0 to 5.5, $SiO_2/Al_2O_3$: 0.7 to 23.8, where RO is MgO, CaO, or BaO, and $R_2O$ is $Li_2O$, $Na_2O$, or $K_2O$.

3. A method for producing a heat shielding material made of an inorganic material including:
 a base material;
 a underlayer layered on the base material and having a TSR greater than a TSR of the base material; and
 a top layer layered on the underlayer, the top layer having a thickness such that the underlayer is not visually recognizable, and transmitting infrared rays, the method comprising:
 sequentially layering a material of the underlayer and a material of the top layer on the base material; and performing firing at a temperature at which a hemispherical temperature of HMS measurement of the top layer falls within 100° C. from the temperature.

4. A heat shielding material made of an inorganic material, comprising:
a base material;
a underlayer layered on the base material; and
a top layer layered on the underlayer,
wherein a material of the underlayer is represented by a Seger formula: RO: 0.1 to 0.5, $R_2O$: 0.5 to 0.9, $B_2O_3$: 0.0 to 1.0, $Al_2O_3$: 2.2 to 10.2, $SiO_2$: 7.2 to 29.2, $TiO_2$: 0.0 to 0.5, $ZrSiO_4$: 0.0 to 5.5, $SiO_2/Al_2O_3$: 0.7 to 23.8, where RO is MgO, CaO, or BaO, and $R_2O$ is $Li_2O$, $Na_2O$, or $K_2O$, and includes a main reflection region where a material of the top layer is not present.

5. The heat shielding material according to claim 4, wherein a hemispherical temperature of HMS measurement of the material of the top layer falls within a range from a firing temperature intended to a temperature lower than the firing temperature by 100° C. or less.

* * * * *